Oct. 27, 1953
R. L. WATHEN
2,657,329
TRAVELING WAVE TUBE
Filed Feb. 21, 1950
3 Sheets-Sheet 1
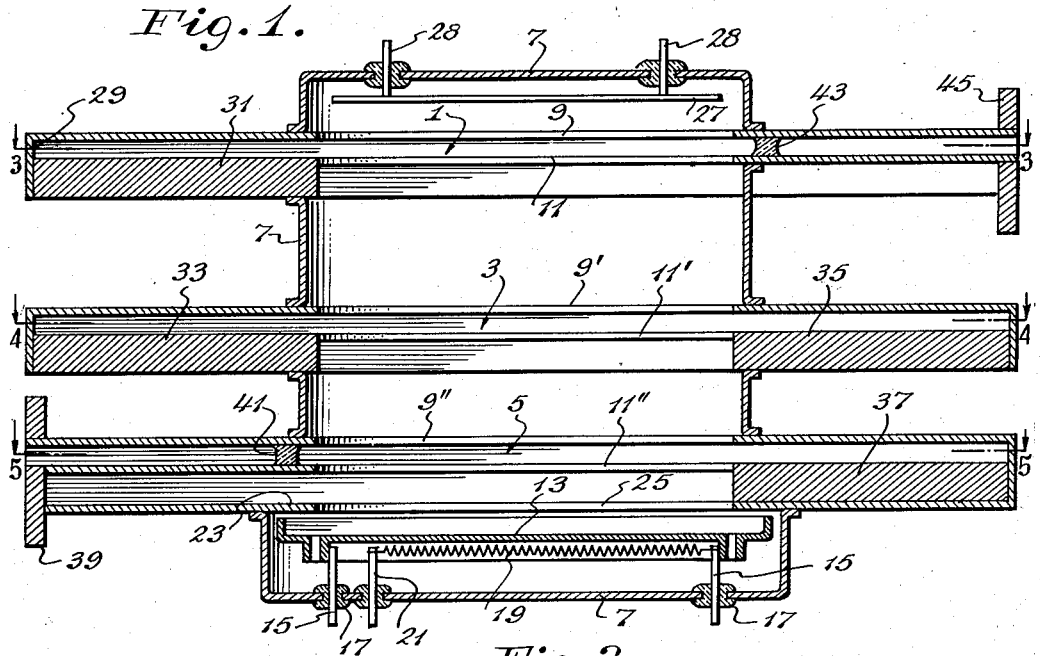
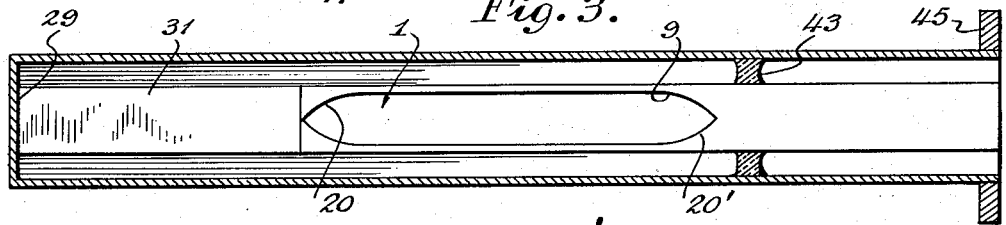
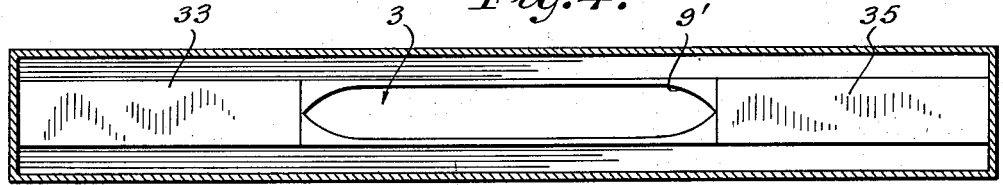
INVENTOR
ROBERT L. WATHEN
BY
Paul B. Hunter
ATTORNEY Oct. 27, 1953   R. L. WATHEN   2,657,329
TRAVELING WAVE TUBE Filed Feb. 21, 1950   3 Sheets-Sheet 2

INVENTOR
ROBERT L. WATHEN
BY
Paul B. Hunter
ATTORNEY

Oct. 27, 1953    R. L. WATHEN    2,657,329
TRAVELING WAVE TUBE
Filed Feb. 21, 1950    3 Sheets-Sheet 3

INVENTOR
ROBERT L. WATHEN
BY
Paul B. Hunter
ATTORNEY

Patented Oct. 27, 1953

2,657,329

UNITED STATES PATENT OFFICE 2,657,329

TRAVELING WAVE TUBE

Robert L. Wathen, Garden City, N. Y., assignor to The Sperry Corporation, Great Neck, N. Y., a corporation of Delaware Application February 21, 1950, Serial No. 145,360

4 Claims. (Cl. 315—6)

This invention relates to improvements in travelling wave tubes, and more particularly to travelling wave tubes of the distributed klystron type, wherein a sheet like stream of electrons flows, transversely to the direction of wave propagation, across one or more electron permeable wave guides, interacting with the waves travelling therein to produce amplification. One such type of travelling wave tube, involving two wave guides used as input and output means or "buncher" and "catcher" respectively, is described in copending U. S. patent application Serial No. 86,018 filed April 7, 1949 by Edward L. Ginzton and entitled Electron Discharge Devices.

One of the principal objects of the present invention is to provide travelling wave tubes of the general type described in said copending application, but including one or more wave guides intermediate the buncher and catcher to provide cascade operation.

Another object is to provide improved oscillator systems including travelling wave tube structures of the above mentioned type.

A more specific object is to provide travelling wave tube oscillators including one or more buffer stages serving to isolate the output means from the oscillation generator means.

A further object is to provide cascade travelling wave tubes in which different sections of a single guide or wave transmission conduit react with an electron stream, the intermediate sections of the guide acting as catchers with respect to the preceding sections and as bunchers with respect to the succeeding sections.

It is another object of this invention to provide improved travelling wave tubes which may be designed compactly and are capable of relatively high amplification and/or large power output with a given total beam current and dissipation.

Figure 6:
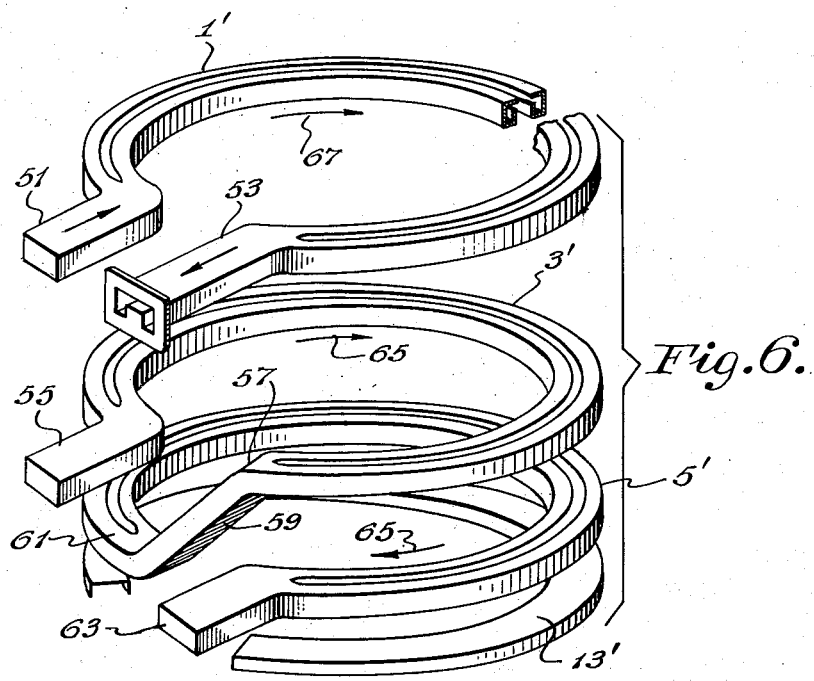
Figure 7:
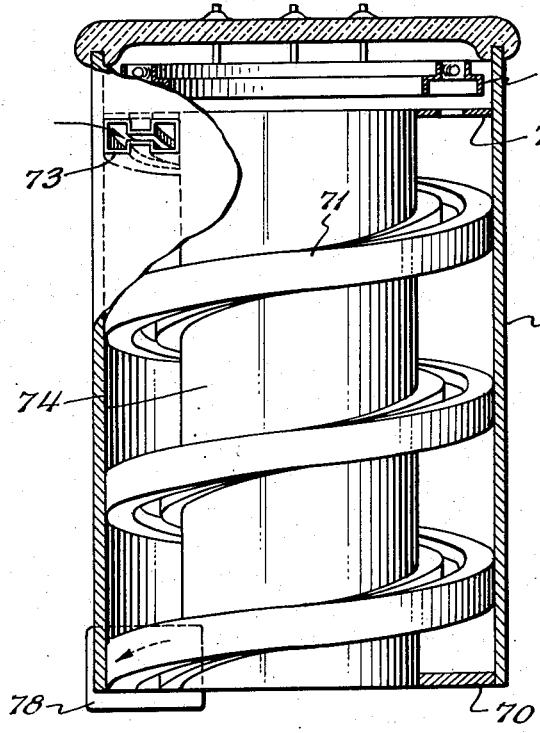
Figure 8:
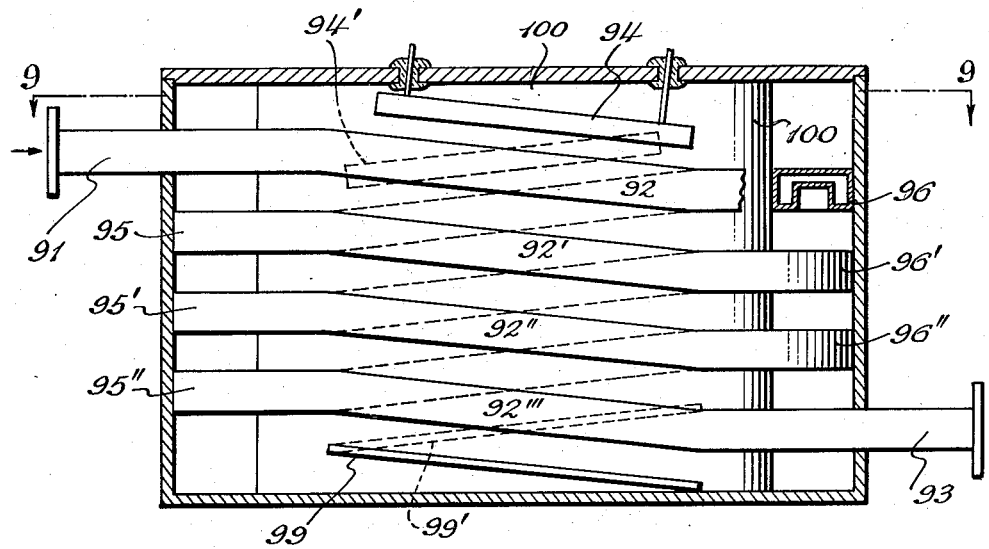
Figure 9:
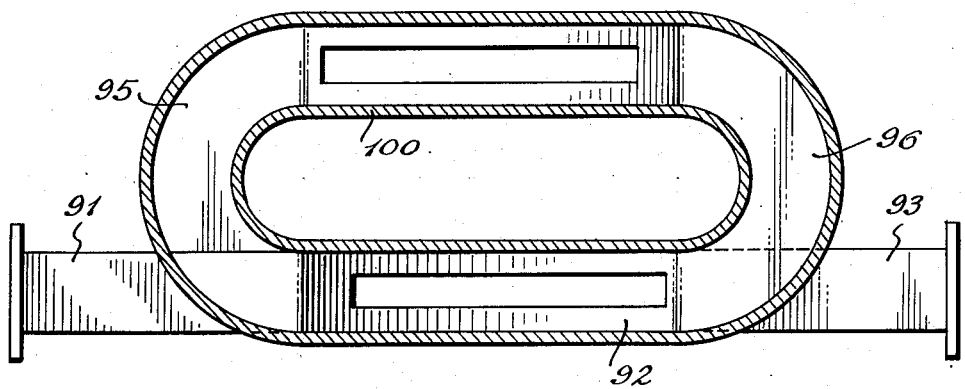

The invention will be described with reference to the accompanying drawings, wherein:

Fig. 1 is an elevation in section of a cascade amplifier tube embodying the invention, Fig. 2 is a transverse cross section of one of the wave guides in the device of Fig. 1, Figs. 3, 4 and 5 are sections of the structure of Fig. 1 in the planes of 3—3, 4—4, and 5—5 respectively of Fig. 1, Fig. 6 is a perspective view of a modified oscilator-buffer amplifier incorporating substantially the same principles as the tube of Fig. 1 but of different construction, Fig. 7 is an elevation, partly in section of a modified cascade amplifier tube, Fig. 8 is an elevation, partly in section, of a further modification of the structure of Fig. 7, and Fig. 9 is a section of the structure of Fig. 8 in the plane 9—9 of Fig. 8.

The cascade amplifier represented in Fig. 1 includes three wave guides 1, 3 and 5 supported in spaced parallel relationship by the walls of a vacuum-tight enclosure or envelope 7, which may be of metal. The wave guides may be of reentrant cross section, as shown in Fig. 2. A part of the wave guide 1 within the envelope 7 is provided with a longitudinally extending slot 9 in its upper wall and a similar slot 11 in its reentrant wall. These slots may be tapered near their ends 20 and 20' as shown by the plan view of the slot 11 in Fig. 3. The wave guides 3 and 5 are provided with similar slots 9', 11', and 9'', 11'' respectively.

A cathode assembly 13 is supported near and below the lower wall of the wave guide 5 on posts 15 which extend through and are supported by vacuum tight insulating bushings or seals 17 in the bottom of the envelope 7. The cathode assembly includes a heater element 19 connected between one of the posts 15 and a similar insulated post 21. The reentrant portion at the bottom of the wave guide 5 is covered by a conductive sheet or plate 23 which may be flush with the bottom wall as shown, and is provided with a longitudinal slot 25 like the slots 9 and 11.

A collector electrode in the form of a relatively long narrow metal strip 27 is supported on insulated posts 28 above the slot 9 in the upper wall of the wave guide 1. The slots 9, 11, 9', 11', etc. in the wave guides may be provided with electron permeable grid structures, or may be gridless as shown in Figs. 3, 4 and 5, depending upon the amount of power that is to be handled by the tube.

The left hand end of the wave guide 1 is closed by a wall 29, and the reentrant portion of the wave guide 1 near this end is replaced by a body 31 of magnetic stainless steel, or similar lossy material suitable for use in vacuum. The body 31 acts as a terminating impedance to minimize reflection of wave energy at the end of the guide 1. The wave guide 3 is similarly terminated at both of its ends by means 33 and 35, and the right hand end of the wave guide 5 is likewise terminated by a body 37.

The left hand end of the guide 5 is provided with a flange 39 or similar means for coupling to an input device such as another wave guide, not shown. A vacuum tight seal or window 41 is provided in the guide 5 near the left hand end. The right hand end of the guide 1 is similarly provided with a window 43 and a flange 45 for coupling to a load or other utilization device not shown.

In the operation of the device of Fig. 1, the cathode assembly 13 is maintained, by means of a battery or other source, not shown, at a relatively highly negative potential with respect to the wave guides and the conductive envelope 7, which may be grounded. The collector electrode 27 may be at the same potential as the wave guides, or may be maintained somewhat positive with respect thereto by suitable connection to the external power supply source.

The heater 19 is energized by an external source connected between the post 21 and one of the posts 15, causing the strip-like emitting surface of the cathode to produce a stream of electrons. The electric field between the cathode assembly and the slotted plate 23 accelerates the electrons and directs the stream in the form of a relatively thin sheet flowing through the slots 25, 11″, 9″, 11′, 9′, 11 and 9 in succession.

Wave energy to be amplified is applied to the left hand end of the wave guide 5, inducing therein a travelling wave which runs down the length of the guide and is substantially totally absorbed by the terminating means 37. The electrons issuing from the slot 25 travel at substantially equal velocities, and all enter the slot 11″ at approximately the same velocity. The wave travelling along the guide 5 produces a high frequency electric field between the upper and lower slotted walls, the phase of the field being progressively retarded in the direction of propagation, i. e. from left to right in Fig. 1. In passing through the field in the guide 5, the electrons are velocity modulated, each linear element of the sheet-like stream being alternately accelerated and decelerated according to the instantaneous variations in the field through which it travels.

The space between the guides 5 and 3 is substantially field-free, like the drift space in a conventional klystron tube. In crossing this space, electrons which have been accelerated in the guide 5 tend to overtake slower moving, earlier emitted electrons, and electrons which have been decelerated are in turn overtaken by faster moving, later emitted electrons. Thus each velocity modulated linear element of the stream forms into bunches wherein the electron density is higher than the average density of the stream, separated by spaces in which the electron density is less than the average.

Successive bunches enter the slot 11′ in the wave guide 3 at intervals equal to the period of the wave energy supplied to the wave guide 5, and in crossing the guide 3 they induce an alternating high frequency field between the upper and lower slotted walls. This field produces waves travelling to the left and right respectively in the guide 3. The linear stream elements are bunched in progressively retarded phase down the length of the tube from left to right, and thus the field induced at any point in the guide 3 is in phase with the field of the wave travelling to the right, and reinforces said wave. The waves travelling to the left do not add in phase, and tend to cancel each other. This phenomenon is substantially the same as that occurring in the operation of the long-slot type of directional coupler. The tapered end portions 20 and 20′ of the slots improve the directionality. Any remnant of leftward travelling wave energy is absorbed at the left end of the guide 3 by the terminating means 33.

The total high frequency field appearing across an elemental transverse section of the guide 3 is the sum of the field produced by the bunched element of the electron stream which goes through that section, plus the field produced by the wave which arrives at that section from the left. Thus, throughout a substantial portion of the length of the guide 3, the field is more intense than the field across the corresponding portion of the guide 5.

In passing through the more intense field in the guide 3, the electron stream is velocity modulated further, in the same manner as it was velocity modulated by the field in the guide 5. The resultant bunching which occurs in the drift space between the guides 3 and 1 is more complete, and thus still more intense fields are induced in the wave guide 1. The fields produced by successive elements of the electron stream add up in phase from left to right, as in the intermediate guide 3, and produce a rightward travelling amplified wave which goes out the right end of the guide 11 for utilization.

Referring to Fig. 6, the wave guides 1′, 3′ and 5′ may be curved into nearly complete circular form, instead of being rectilinear. The cathode 13′ is similarly curved. The vacuum envelope and collector electrode are not shown in Fig. 6, but it will be apparent that they also may be made circular or annular to conform with the wave guides. The output wave guide 1′ is terminated at its end 51 by low reflection means such as those used in the tube of Fig. 1. The other end 53 of the guide 1′ may include a vacuum tight window or seal, and is adapted to be coupled to a load or utilization device.

The end 55 of the intermediate wave guide 3′ is terminated like the end 51 of the guide 1′. The other end 57 of the guide 3′ is coupled through a wave guide section 59 to the end 61 of the wave guide 5′. The other end 63 of the guide 5′, which corresponds in position to the ends 53 and 57 of the guides 1′ and 3′ respectively, is terminated by a low-reflection plug like the ends 51 and 55.

Any signals appearing in the intermediate guide 3′ will set up waves travelling therein in the direction of the arrows 65. These waves are fed back to the guide 5′ by way of the coupling section 59, and will cause velocity modulation of the electron stream from the cathode 13′. The stream will become bunched in travelling from the guide 5′ to the guide 3′, exciting further waves in the guide 3′. Waves whose length are properly related to the length of the feedback path 59 will excite the guides 5′ and 3′ in such phase that the electron bunches crossing the guide 3′ will reinforce them, thus sustaining the oscillations. The frequency of oscillation may be varied within wide limits by varying the length of the feedback guide 59, either electrically as by means of a phase shifter device, or physically as by a so-called "trombone" arrangement. The electron stream emerging from the intermediate guide 3′ is velocity modulated so as to form relatively intense bunches at the output guide 1′. The wave induced in the guide 1′ travels in the direction of the arrow 67 to the output end 53.

The device of Fig. 6 has the advantages characteristic of that of Fig. 1, i. e. high power capability and freedom from critical beam focussing problems, and in addition offers convenient means for generating high frequency energy without the limitations imposed by cavity resonators such as are used in conventional klystron tubes.

Fig. 7 shows a cascade amplifier embodying the principles of the present invention, and comprising a single wave guide 71 formed helically with its turns overlying each other between an annular cathode 72 and a collector electrode 70. An annular accelerating electrode 77 is provided near the cathode 72, and a vacuum envelope 75 surrounds the structure. The guide 71 may be supported between the envelope 75 and a central cylindrical member 74. The ends 73 and 78 of the guide 71 are brought out through the envelope 75 and provided with suitable seals or windows, not shown.

In the operation of the tube of Fig. 7, energy to be amplified is applied to the end 73 of the guide 71, producing a wave which travels down the guide to the output end 78. In traversing the first turn of the helix, this wave causes velocity modulation of the tubular electron stream, which arrives in partially bunched condition at the second turn. Providing the frequency of the input energy is properly related to the length of one turn of the helix, the bunched stream will reinforce the wave, and produce further bunching at the next turn. This process continues with successive turns of the helix, the stream becoming more intensely bunched with each passage across the guide. The amplified wave appears at the end 78 of the guide, which may be coupled to any suitable utilization means.

Figs. 8 and 9 show a further modification of the device of Fig. 7, wherein the progression of the wave guide down the structure is made in steps rather than as a uniform circular helix. The guide comprises straight sections 92, 92', 92" and 92''' interconnected serially at their ends by arcuate guide sections 95, 95' and 95" at one end and 96, 96' and 96" at the other.

The cathode consists of two straight strips 94 and 94' in line with the straight wave guide sections on opposite sides of the central support 100, and the collector similarly comprises a straight strip 99 and a corresponding strip, not shown, on the other side of the support 100. The end 91 of the wave guide is adapted to be coupled to an input device, and output is taken from the other end 93.

The operation of the tube of Fig. 8 is substantially the same as that of Fig. 7. As in the device of Fig. 7, the length of one turn about the structure must be related to an integral number of wavelengths of the operating frequency for optimum efficiency.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electron discharge device including a wave guide having two opposed walls with electron permeable portions extending along the direction of energy propagation in said guide, a cathode extending generally parallel to said guide and adjacent one of said electron permeable wall portions, a second wave guide similar to said first guide and disposed on the other side thereof from said cathode, said second guide being substantially parallel to said first guide and separated therefrom by a drift space, low reflection means terminating both ends of said second guide, a third wave guide similar to said first wave guide and disposed on the other side of said second guide from said first guide and separated from said second guide by a second drift space; means for supplying high frequency energy to one end of said first wave guide, low reflection means terminating the corresponding end of said third guide, and means for absorbing high frequency energy from the opposite end of said third guide.

2. A cascade amplifier device for high frequency wave energy, including first, second and third electron permeable wave guide portions spaced apart transversely to the direction of wave propagation therein, means for producing and directing a sheet-like stream of electrons across said first, second, and third wave guide portions consecutively, means for supplying high frequency energy to one end of said first wave guide, low-reflection terminating means at the other end of said first wave guide, low-reflection terminating means at each end of said second guide and at the end of said third guide which is nearer the first mentioned end of said first guide, and means for leading high frequency energy away from the other end of said third guide.

3. An electronic device including a wave transmission conduit of reentrant cross section transversely of the direction of wave transmission, a slot in the face of the reentrant portion, said slot having tapered ends, said slot extending longitudinally in said reentrant portion, and means for providing a stream of electrons passing through said slot.

4. A cascade amplifier device for high frequency wave energy, including an input wave guide, an intermediate wave guide and an output wave guide, each of said guides being of reentrant cross section transversely of the direction of wave transmission therein and having two opposed longitudinally extending electron permeable walls separated by a distance that is short compared to the major cross sectional dimension of the guide, said guides being substantially longitudinally coextensive but spaced apart from each other in the same direction as the spacing between said electron permeable walls, means for producing a thin sheet electron stream having a width substantially equal to the length of said electron permeable walls, and for directing said stream through said walls and across said input, intermediate, and output guides in succession, means for supplying high frequency energy to be amplified to one end of said input guide, low reflection means terminating the other end of said input guide, means for leading amplified energy away from the end of said output guide remote from the first mentioned end of said input guide, low reflection means terminating the other end of said output guide, and low reflection means terminating both ends of said intermediate guide.

ROBERT L. WATHEN.

References Cited in the file of this patent
UNITED STATES PATENTS

| Number | Name | Date |
|---|---|---|
| 2,122,538 | Potter | July 5, 1938 |
| 2,272,165 | Varian et al. | Feb. 3, 1942 |
| 2,289,846 | Litton | July 14, 1942 |
| 2,320,860 | Fremlin | June 1, 1943 |
| 2,367,295 | Llewellyn | Jan. 16, 1945 |
| 2,368,031 | Llewellyn | Jan. 23, 1945 |
| 2,457,524 | Bowen | Dec. 28, 1948 |
| 2,485,661 | Roach | Oct. 25, 1949 |
| 2,509,374 | Sunstein | May 30, 1950 |